(12) United States Patent
Gupta

(10) Patent No.: US 7,158,690 B2
(45) Date of Patent: Jan. 2, 2007

(54) ENHANCING THE RESOLUTION OF MEASUREMENT SYSTEMS EMPLOYING IMAGE CAPTURING SYSTEMS TO MEASURE LENGTHS

(75) Inventor: Ajay Gupta, Bhilai (IN)

(73) Assignee: Texas Instruments Incorporated, Dallas, TX (US)

( * ) Notice: Subject to any disclaimer, the term of this patent is extended or adjusted under 35 U.S.C. 154(b) by 684 days.

(21) Appl. No.: 10/323,773

(22) Filed: Dec. 20, 2002

(65) Prior Publication Data

US 2004/0120603 A1 Jun. 24, 2004

(51) Int. Cl.

| | |
|---|---|
| G06K 9/36 | (2006.01) |
| G01B 5/02 | (2006.01) |
| G01B 5/14 | (2006.01) |
| G01B 7/02 | (2006.01) |
| G01B 7/14 | (2006.01) |
| G01B 11/02 | (2006.01) |
| G01B 11/14 | (2006.01) |
| G01B 13/02 | (2006.01) |
| G01B 21/02 | (2006.01) |
| G01C 22/00 | (2006.01) |
| G06F 15/00 | (2006.01) |

(52) U.S. Cl. ...................................... 382/286; 702/158
(58) Field of Classification Search ................ 382/141, 382/151, 286; 356/616, 634; 702/158
See application file for complete search history.

(56) References Cited

U.S. PATENT DOCUMENTS

| | | | | | |
|---|---|---|---|---|---|
| 4,484,816 | A | * | 11/1984 | Ohtomo et al. ............. | 356/617 |
| 4,529,964 | A | * | 7/1985 | Minami et al. ................ | 341/13 |
| 4,794,251 | A | * | 12/1988 | Scholian ................. | 250/231.17 |
| 4,991,125 | A | * | 2/1991 | Ichikawa ................. | 250/237 G |
| 5,229,597 | A | * | 7/1993 | Fukatsu .................... | 250/208.2 |
| 5,717,488 | A | * | 2/1998 | Watanabe ................... | 356/499 |
| 6,772,948 | B1 | * | 8/2004 | Kim ....................... | 235/462.25 |

OTHER PUBLICATIONS

Wang ("An Automatic Vernier Scale Method by CCD Linear Sensor", IEEE 1994 Instrumentation and Measurement Technology Conference, May 10-12, pp. 1353-1356).*
J.T.M. Stevenson and J. R. Jordan; Entitled:"Metrological gratings and moiré fringe detection methods for displacement transducers"; IEE Proceedings, vol. 136, Pt. A, No. 5, Sep. 1989; pp. 243-253; (11 Pages).
Schlenker Enterprises Ltd.; Entitled: How to read a Vernier Scale (Using Verniers); Available from www.schlenkent.com/vernier.htm; (2 Pages).
Schlenker Enterprises Ltd.; Entitled: Verniers (for Vernier scale tutorial); Available from www.schlenkent.com/example-vernier.htm; (1 Page).

* cited by examiner

*Primary Examiner*—Jingge Wu
*Assistant Examiner*—Yubin Hung
(74) *Attorney, Agent, or Firm*—Robert D. Marshall, Jr.; W. James Brady; Frederick J. Telecky, Jr.

(57) ABSTRACT

Two scales having unequal pitches are used to measure lengths with a greater resolution than that offered by an image capturing system operating alone. In an embodiment, the different pitches are attained by having bands of unequal width in the two scales. Images representing the overlapping patterns of the two bands are captured in a digital format before and after a move. The bit patterns resulting from such capturing are examined to determine the length of the move with a high resolution according to Vernier principles. The length of the move can in turn be used to measure the length of an object with high resolution.

5 Claims, 16 Drawing Sheets

| PIXEL NUMBER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| PIXEL COVERAGE | 0.0 TO 0.5 | 0.5 TO 1.0 | 1.0 TO 1.5 | 1.5 TO 2.0 | 2.0 TO 2.5 | 2.5 TO 3.0 | 3.0 TO 3.5 | 3.5 TO 4.0 | 4.0 TO 4.5 | 4.5 TO 5.0 | 5.0 TO 5.5 | 5.5 TO 6.0 | 6.0 TO 6.5 | 6.5 TO 7.0 | 7.0 TO 7.5 | 7.5 TO 8.0 | 8.0 TO 8.5 | 8.5 TO 9.0 |
| DARK PORTION DUE TO SCALE 140 | 0.0 TO 0.5 | - | 1.0 TO 1.5 | - | 2.0 TO 2.5 | - | 3.0 TO 3.5 | - | 4.0 TO 4.5 | - | 5.0 TO 5.5 | - | 6.0 TO 6.5 | - | 7.0 TO 7.5 | - | 8.0 TO 8.5 | - |
| DARK PORTION DUE TO SCALE 150 | 0.0 TO 0.45 | 0.9 TO 1.0 | 1.0 TO 1.35 | 1.8 TO 2.0 | 2.0 TO 2.25 | 2.7 TO 3.0 | 3.0 TO 3.15 | 3.6 TO 4.0 | 4.0 TO 4.05 | 4.5 TO 4.95 | 5.4 TO 5.5 | 5.5 TO 5.85 | 6.3 TO 6.5 | 6.5 TO 6.75 | 7.2 TO 7.5 | 7.5 TO 7.65 | 8.1 TO 8.5 | 8.5 TO 8.55 |
| DARK AREA COVERAGE | 0.0 TO 0.5 | 0.9 TO 1.0 | 1.0 TO 1.5 | 1.8 TO 2.0 | 2.0 TO 2.5 | 2.7 TO 3.0 | 3.0 TO 3.5 | 3.6 TO 4.0 | 4.0 TO 4.5 | 4.5 TO 4.95 | 5.0 TO 5.5 | 5.5 TO 5.85 | 6.0 TO 6.5 | 6.5 TO 6.75 | 7.0 TO 7.5 | 7.5 TO 7.65 | 8.0 TO 8.5 | 8.5 TO 8.55 |
| PERCENT DARK AREA | 100 | 20 | 100 | 40 | 100 | 60 | 100 | 80 | 100 | 90 | 100 | 70 | 100 | 50 | 100 | 30 | 100 | 10 |
| PIXEL STATUS | 0 | 1 | 0 | 1 | 0 | 0 | 0 | 0 | 0 | 0 | 0 | 0 | 0 | 0 | 0 | 1 | 0 | 1 |

*FIG. 5A*

| | 560-A | 560-B | 560-C | 560-D | 560-E | 560-F | 560-G | 560-H | 560-I | 560-J | 560-K | 560-L | 560-M | 560-N | 560-O | 560-P | 560-Q | 560-R |
|---|---|---|---|---|---|---|---|---|---|---|---|---|---|---|---|---|---|---|
| PIXEL NUMBER | 1 | 2 | 3 | 4 | 5 | 6 | 7 | 8 | 9 | 10 | 11 | 12 | 13 | 14 | 15 | 16 | 17 | 18 |
| PIXEL COVERAGE (561) | 0.0 TO 0.5 | 0.5 TO 1.0 | 1.0 TO 1.5 | 1.5 TO 2.0 | 2.0 TO 2.5 | 2.5 TO 3.0 | 3.0 TO 3.5 | 3.5 TO 4.0 | 4.0 TO 4.5 | 4.5 TO 5.0 | 5.0 TO 5.5 | 5.5 TO 6.0 | 6.0 TO 6.5 | 6.5 TO 7.0 | 7.0 TO 7.5 | 7.5 TO 8.0 | 8.0 TO 8.5 | 8.5 TO 9.0 |
| DARK PORTION DUE TO SCALE 140 (562) | 0.0 TO 0.5 | - | 1.0 TO 1.5 | - | 2.0 TO 2.5 | - | 3.0 TO 3.5 | - | 4.0 TO 4.5 | - | 5.0 TO 5.5 | - | 6.0 TO 6.5 | - | 7.0 TO 7.5 | - | 8.0 TO 8.5 | - |
| DARK PORTION DUE TO SCALE 150 (563) | 0.1 TO 0.5 | 0.5 TO 0.55 | 1.0 TO 1.45 | 1.9 TO 2.0 | 2.0 TO 2.35 | 2.8 TO 3.0 | 3.0 TO 3.25 | 3.7 TO 4.0 | 4.0 TO 4.15 | 4.6 TO 5.0 | 5.0 TO 5.05 | 5.5 TO 5.95 | 6.4 TO 6.5 | 6.5 TO 6.85 | 7.3 TO 7.5 | 7.5 TO 7.75 | 8.2 TO 8.5 | 8.5 TO 8.65 |
| DARK AREA COVERAGE (565) | 0.0 TO 0.5 | 0.5 TO 0.55 | 1.0 TO 1.5 | 1.9 TO 2.0 | 2.0 TO 2.5 | 2.8 TO 3.0 | 3.0 TO 3.5 | 3.7 TO 4.0 | 4.0 TO 4.5 | 4.6 TO 5.0 | 5.0 TO 5.5 | 5.5 TO 5.95 | 6.0 TO 6.5 | 6.5 TO 6.85 | 7.0 TO 7.5 | 7.5 TO 7.75 | 8.0 TO 8.5 | 8.5 TO 8.65 |
| PERCENT DARK AREA (580) | 100 | 10 | 100 | 20 | 100 | 40 | 100 | 60 | 100 | 80 | 100 | 90 | 100 | 70 | 100 | 50 | 100 | 30 |
| PIXEL STATUS (590) | 0 | 1 | 0 | 1 | 0 | 1 | 0 | 0 | 0 | 0 | 0 | 0 | 0 | 0 | 0 | 0 | 0 | 1 |

*FIG. 5B*

| PIXEL NUMBER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| PIXEL COVERAGE | 0.0 TO 0.5 | 0.5 TO 1.0 | 1.0 TO 1.5 | 1.5 TO 2.0 | 2.0 TO 2.5 | 2.5 TO 3.0 | 3.0 TO 3.5 | 3.5 TO 4.0 | 4.0 TO 4.5 | 4.5 TO 5.0 | 5.0 TO 5.5 | 5.5 TO 6.0 | 6.0 TO 6.5 | 6.5 TO 7.0 | 7.0 TO 7.5 | 7.5 TO 8.0 | 8.0 TO 8.5 | 8.5 TO 9.0 |
| DARK PORTION DUE TO SCALE 140 | 0.0 TO 0.5 | - | 1.0 TO 1.5 | - | 2.0 TO 2.5 | - | 3.0 TO 3.5 | - | 4.0 TO 4.5 | - | 5.0 TO 5.5 | - | 6.0 TO 6.5 | - | 7.0 TO 7.5 | - | 8.0 TO 8.5 | - |
| DARK PORTION DUE TO SCALE 150 | 0.2 TO 0.5 | 0.5 TO 0.65 | 1.1 TO 1.5 | 1.5 TO 1.55 | 2.0 TO 2.45 | 2.9 TO 3.0 | 3.0 TO 3.35 | 3.8 TO 4.0 | 4.0 TO 4.25 | 4.7 TO 5.0 | 5.0 TO 5.15 | 5.6 TO 6.0 | 6.0 TO 6.05 | 6.5 TO 6.95 | 7.4 TO 7.5 | 7.5 TO 7.85 | 8.3 TO 8.5 | 8.5 TO 8.75 |
| DARK AREA COVERAGE | 0.0 TO 0.5 | 0.5 TO 0.65 | 1.0 TO 1.5 | 1.5 TO 1.55 | 2.0 TO 2.5 | 2.9 TO 3.0 | 3.0 TO 3.5 | 3.8 TO 4.0 | 4.0 TO 4.5 | 4.7 TO 5.0 | 5.0 TO 5.5 | 5.6 TO 6.0 | 6.0 TO 6.5 | 6.5 TO 6.95 | 7.0 TO 7.5 | 7.5 TO 7.85 | 8.0 TO 8.5 | 8.5 TO 8.75 |
| PERCENT DARK AREA | 100 | 30 | 100 | 10 | 100 | 20 | 100 | 40 | 100 | 60 | 100 | 80 | 100 | 90 | 100 | 70 | 100 | 50 |
| PIXEL STATUS | 0 | 1 | 0 | 1 | 0 | 1 | 0 | 1 | 0 | 0 | 0 | 0 | 0 | 0 | 0 | 0 | 0 | 0 |

| PIXEL NUMBER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| PIXEL COVERAGE | 0.0 TO 0.5 | 0.5 TO 1.0 | 1.0 TO 1.5 | 1.5 TO 2.0 | 2.0 TO 2.5 | 2.5 TO 3.0 | 3.0 TO 3.5 | 3.5 TO 4.0 | 4.0 TO 4.5 | 4.5 TO 5.0 | 5.0 TO 5.5 | 5.5 TO 6.0 | 6.0 TO 6.5 | 6.5 TO 7.0 | 7.0 TO 7.5 | 7.5 TO 8.0 | 8.0 TO 8.5 | 8.5 TO 9.0 |
| DARK PORTION DUE TO SCALE 140 | 0.0 TO 0.5 | - | 1.0 TO 1.5 | - | 2.0 TO 2.5 | - | 3.0 TO 3.5 | - | 4.0 TO 4.5 | - | 5.0 TO 5.5 | - | 6.0 TO 6.5 | - | 7.0 TO 7.5 | - | 8.0 TO 8.5 | - |
| DARK PORTION DUE TO SCALE 150 | 0.3 TO 0.5 | 0.5 TO 0.75 | 1.2 TO 1.5 | 1.5 TO 1.65 | 2.1 TO 2.5 | 2.5 TO 2.55 | 3.0 TO 3.45 | 3.9 TO 4.0 | 4.0 TO 4.35 | 4.8 TO 5.0 | 5.0 TO 5.25 | 5.7 TO 6.0 | 6.0 TO 6.15 | 6.6 TO 7.0 | 7.0 TO 7.05 | 7.5 TO 7.95 | 8.4 TO 8.5 | 8.5 TO 8.85 |
| DARK AREA COVERAGE | 0.0 TO 0.5 | 0.5 TO 0.75 | 1.0 TO 1.5 | 1.5 TO 1.65 | 2.0 TO 2.5 | 2.5 TO 2.55 | 3.0 TO 3.5 | 3.9 TO 4.0 | 4.0 TO 4.5 | 4.8 TO 5.0 | 5.0 TO 5.5 | 5.7 TO 6.0 | 6.0 TO 6.5 | 6.6 TO 7.0 | 7.0 TO 7.5 | 7.5 TO 7.95 | 8.0 TO 8.5 | 8.5 TO 8.85 |
| PERCENT DARK AREA | 100 | 50 | 100 | 30 | 100 | 10 | 100 | 20 | 100 | 40 | 100 | 60 | 100 | 80 | 100 | 90 | 100 | 70 |
| PIXEL STATUS | 0 | 0 | 0 | 1 | 0 | 1 | 0 | 1 | 0 | 1 | 0 | 0 | 0 | 0 | 0 | 0 | 0 | 0 |

| | 560-A | 560-B | 560-C | 560-D | 560-E | 560-F | 560-G | 560-H | 560-I | 560-J | 560-K | 560-L | 560-M | 560-N | 560-O | 560-P | 560-Q | 560-R |
|---|---|---|---|---|---|---|---|---|---|---|---|---|---|---|---|---|---|---|
| PIXEL NUMBER | 1 | 2 | 3 | 4 | 5 | 6 | 7 | 8 | 9 | 10 | 11 | 12 | 13 | 14 | 15 | 16 | 17 | 18 |
| PIXEL COVERAGE (561) | 0.0 TO 0.5 | 0.5 TO 1.0 | 1.0 TO 1.5 | 1.5 TO 2.0 | 2.0 TO 2.5 | 2.5 TO 3.0 | 3.0 TO 3.5 | 3.5 TO 4.0 | 4.0 TO 4.5 | 4.5 TO 5.0 | 5.0 TO 5.5 | 5.5 TO 6.0 | 6.0 TO 6.5 | 6.5 TO 7.0 | 7.0 TO 7.5 | 7.5 TO 8.0 | 8.0 TO 8.5 | 8.5 TO 9.0 |
| DARK PORTION DUE TO SCALE 140 (562) | 0.0 TO 0.5 | - | 1.0 TO 1.5 | - | 2.0 TO 2.5 | - | 3.0 TO 3.5 | - | 4.0 TO 4.5 | - | 5.0 TO 5.5 | - | 6.0 TO 6.5 | - | 7.0 TO 7.5 | - | 8.0 TO 8.5 | - |
| DARK PORTION DUE TO SCALE 150 (563) | 0.4 TO 0.5 | 0.5 TO 0.85 | 1.3 TO 1.5 | 1.5 TO 1.75 | 2.2 TO 2.5 | 2.5 TO 2.65 | 3.1 TO 3.5 | 3.5 TO 3.55 | 4.0 TO 4.45 | 4.9 TO 5.0 | 5.0 TO 5.35 | 5.8 TO 6.0 | 6.0 TO 6.25 | 6.7 TO 7.0 | 7.0 TO 7.15 | 7.6 TO 8.0 | 8.0 TO 8.05 | 8.5 TO 8.95 |
| DARK AREA COVERAGE (565) | 0.0 TO 0.5 | 0.5 TO 0.85 | 1.0 TO 1.5 | 1.5 TO 1.75 | 2.0 TO 2.5 | 2.5 TO 2.65 | 3.0 TO 3.5 | 3.5 TO 3.55 | 4.0 TO 4.5 | 4.9 TO 5.0 | 5.0 TO 5.5 | 5.8 TO 6.0 | 6.0 TO 6.5 | 6.7 TO 7.0 | 7.0 TO 7.5 | 7.6 TO 8.0 | 8.0 TO 8.5 | 8.5 TO 8.95 |
| PERCENT DARK AREA (580) | 100 | 70 | 100 | 50 | 100 | 30 | 100 | 10 | 100 | 20 | 100 | 40 | 100 | 60 | 100 | 80 | 100 | 90 |
| PIXEL STATUS (590) | 0 | 0 | 0 | 0 | 0 | 1 | 0 | 1 | 0 | 1 | 0 | 1 | 0 | 0 | 0 | 0 | 0 | 0 |

*FIG. 5E*

| | 560-A | 560-B | 560-C | 560-D | 560-E | 560-F | 560-G | 560-H | 560-I | 560-J | 560-K | 560-L | 560-M | 560-N | 560-O | 560-P | 560-Q | 560-R |
|---|---|---|---|---|---|---|---|---|---|---|---|---|---|---|---|---|---|---|
| PIXEL NUMBER | 1 | 2 | 3 | 4 | 5 | 6 | 7 | 8 | 9 | 10 | 11 | 12 | 13 | 14 | 15 | 16 | 17 | 18 |
| PIXEL COVERAGE (561) | 0.0 TO 0.5 | 0.5 TO 1.0 | 1.0 TO 1.5 | 1.5 TO 2.0 | 2.0 TO 2.5 | 2.5 TO 3.0 | 3.0 TO 3.5 | 3.5 TO 4.0 | 4.0 TO 4.5 | 4.5 TO 5.0 | 5.0 TO 5.5 | 5.5 TO 6.0 | 6.0 TO 6.5 | 6.5 TO 7.0 | 7.0 TO 7.5 | 7.5 TO 8.0 | 8.0 TO 8.5 | 8.5 TO 9.0 |
| DARK PORTION DUE TO SCALE 140 (562) | 0.0 TO 0.5 | - | 1.0 TO 1.5 | - | 2.0 TO 2.5 | - | 3.0 TO 3.5 | - | 4.0 TO 4.5 | - | 5.0 TO 5.5 | - | 6.0 TO 6.5 | - | 7.0 TO 7.5 | - | 8.0 TO 8.5 | - |
| DARK PORTION DUE TO SCALE 150 (563) | 0.0 TO 0.05 | 0.5 TO 0.95 | 1.4 TO 1.5 | 1.5 TO 1.85 | 2.3 TO 2.5 | 2.5 TO 2.75 | 3.2 TO 3.5 | 3.5 TO 3.65 | 4.1 TO 4.5 | 4.5 TO 4.55 | 5.0 TO 5.45 | 5.9 TO 6.0 | 6.0 TO 6.35 | 6.8 TO 7.0 | 7.0 TO 7.25 | 7.7 TO 8.0 | 8.0 TO 8.15 | 8.6 TO 9.0 |
| DARK AREA COVERAGE (565) | 0.0 TO 0.5 | 0.5 TO 0.95 | 1.0 TO 1.5 | 1.5 TO 1.85 | 2.0 TO 2.5 | 2.5 TO 2.75 | 3.0 TO 3.5 | 3.5 TO 3.65 | 4.0 TO 4.5 | 4.5 TO 4.55 | 5.0 TO 5.5 | 5.9 TO 6.0 | 6.0 TO 6.5 | 6.8 TO 7.0 | 7.0 TO 7.5 | 7.7 TO 8.0 | 8.0 TO 8.5 | 8.6 TO 9.0 |
| PERCENT DARK AREA (580) | 100 | 90 | 100 | 70 | 100 | 50 | 100 | 30 | 100 | 10 | 100 | 20 | 100 | 40 | 100 | 60 | 100 | 80 |
| PIXEL STATUS (590) | 0 | 0 | 0 | 0 | 0 | 0 | 0 | 1 | 0 | 1 | 0 | 1 | 0 | 1 | 0 | 0 | 0 | 0 |

*FIG. 5F*

| PIXEL NUMBER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| PIXEL COVERAGE | 0.0 TO 0.5 | 0.5 TO 1.0 | 1.0 TO 1.5 | 1.5 TO 2.0 | 2.0 TO 2.5 | 2.5 TO 3.0 | 3.0 TO 3.5 | 3.5 TO 4.0 | 4.0 TO 4.5 | 4.5 TO 5.0 | 5.0 TO 5.5 | 5.5 TO 6.0 | 6.0 TO 6.5 | 6.5 TO 7.0 | 7.0 TO 7.5 | 7.5 TO 8.0 | 8.0 TO 8.5 | 8.5 TO 9.0 |
| DARK PORTION DUE TO SCALE 140 | 0.0 TO 0.5 | - | 1.0 TO 1.5 | - | 2.0 TO 2.5 | - | 3.0 TO 3.5 | - | 4.0 TO 4.5 | - | 5.0 TO 5.5 | - | 6.0 TO 6.5 | - | 7.0 TO 7.5 | - | 8.0 TO 8.5 | - |
| DARK PORTION DUE TO SCALE 150 | 0.0 TO 0.15 | 0.6 TO 1.0 | 1.0 TO 1.05 | 1.5 TO 1.95 | 2.4 TO 2.5 | 2.5 TO 2.85 | 3.3 TO 3.5 | 3.5 TO 3.75 | 4.2 TO 4.5 | 4.5 TO 4.65 | 5.1 TO 5.5 | 5.5 TO 5.55 | 6.0 TO 6.45 | 6.9 TO 7.0 | 7.0 TO 7.35 | 7.8 TO 8.0 | 8.0 TO 8.25 | 8.7 TO 9.0 |
| DARK AREA COVERAGE | 0.0 TO 0.5 | 0.6 TO 1.0 | 1.0 TO 1.5 | 1.5 TO 1.95 | 2.0 TO 2.5 | 2.5 TO 2.85 | 3.0 TO 3.5 | 3.5 TO 3.75 | 4.0 TO 4.5 | 4.5 TO 4.65 | 5.0 TO 5.5 | 5.5 TO 5.55 | 6.0 TO 6.5 | 6.9 TO 7.0 | 7.0 TO 7.5 | 7.8 TO 8.0 | 8.0 TO 8.5 | 8.7 TO 9.0 |
| PERCENT DARK AREA | 100 | 80 | 100 | 90 | 100 | 70 | 100 | 50 | 100 | 30 | 100 | 10 | 100 | 20 | 100 | 40 | 100 | 60 |
| PIXEL STATUS | 0 | 0 | 0 | 0 | 0 | 0 | 0 | 0 | 0 | 1 | 0 | 1 | 0 | 1 | 0 | 1 | 0 | 0 |

| PIXEL NUMBER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| PIXEL COVERAGE | 0.0 TO 0.5 | 0.5 TO 1.0 | 1.0 TO 1.5 | 1.5 TO 2.0 | 2.0 TO 2.5 | 2.5 TO 3.0 | 3.0 TO 3.5 | 3.5 TO 4.0 | 4.0 TO 4.5 | 4.5 TO 5.0 | 5.0 TO 5.5 | 5.5 TO 6.0 | 6.0 TO 6.5 | 6.5 TO 7.0 | 7.0 TO 7.5 | 7.5 TO 8.0 | 8.0 TO 8.5 | 8.5 TO 9.0 |
| DARK PORTION DUE TO SCALE 140 | 0.0 TO 0.5 | - | 1.0 TO 1.5 | - | 2.0 TO 2.5 | - | 3.0 TO 3.5 | - | 4.0 TO 4.5 | - | 5.0 TO 5.5 | - | 6.0 TO 6.5 | - | 7.0 TO 7.5 | - | 8.0 TO 8.5 | - |
| DARK PORTION DUE TO SCALE 150 | 0.0 TO 0.25 | 0.7 TO 1.0 | 1.0 TO 1.15 | 1.6 TO 2.0 | 2.0 TO 2.05 | 2.5 TO 2.95 | 3.4 TO 3.5 | 3.5 TO 3.85 | 4.3 TO 4.5 | 4.5 TO 4.75 | 5.2 TO 5.5 | 5.5 TO 5.65 | 6.1 TO 6.5 | 6.5 TO 6.55 | 7.0 TO 7.45 | 7.9 TO 8.0 | 8.0 TO 8.35 | 8.8 TO 9.0 |
| DARK AREA COVERAGE | 0.0 TO 0.5 | 0.7 TO 1.0 | 1.0 TO 1.5 | 1.6 TO 2.0 | 2.0 TO 2.5 | 2.5 TO 2.95 | 3.0 TO 3.5 | 3.5 TO 3.85 | 4.0 TO 4.5 | 4.5 TO 4.75 | 5.0 TO 5.5 | 5.5 TO 5.65 | 6.0 TO 6.5 | 6.5 TO 6.55 | 7.0 TO 7.5 | 7.9 TO 8.0 | 8.0 TO 8.5 | 8.8 TO 9.0 |
| PERCENT DARK AREA | 100 | 60 | 100 | 80 | 100 | 90 | 100 | 70 | 100 | 50 | 100 | 30 | 100 | 10 | 100 | 20 | 100 | 40 |
| PIXEL STATUS | 0 | 0 | 0 | 0 | 0 | 0 | 0 | 0 | 0 | 0 | 0 | 1 | 0 | 1 | 0 | 1 | 0 | 1 |

| PIXEL NUMBER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| PIXEL COVERAGE | 0.0 TO 0.5 | 0.5 TO 1.0 | 1.0 TO 1.5 | 1.5 TO 2.0 | 2.0 TO 2.5 | 2.5 TO 3.0 | 3.0 TO 3.5 | 3.5 TO 4.0 | 4.0 TO 4.5 | 4.5 TO 5.0 | 5.0 TO 5.5 | 5.5 TO 6.0 | 6.0 TO 6.5 | 6.5 TO 7.0 | 7.0 TO 7.5 | 7.5 TO 8.0 | 8.0 TO 8.5 | 8.5 TO 9.0 |
| DARK PORTION DUE TO SCALE 140 | 0.0 TO 0.5 | - | 1.0 TO 1.5 | - | 2.0 TO 2.5 | - | 3.0 TO 3.5 | - | 4.0 TO 4.5 | - | 5.0 TO 5.5 | - | 6.0 TO 6.5 | - | 7.0 TO 7.5 | - | 8.0 TO 8.5 | - |
| DARK PORTION DUE TO SCALE 150 | 0.0 TO 0.35 | 0.8 TO 1.0 | 1.0 TO 1.25 | 1.7 TO 2.0 | 2.0 TO 2.15 | 2.6 TO 3.0 | 3.0 TO 3.05 | 3.5 TO 3.95 | 4.4 TO 4.5 | 4.5 TO 4.85 | 5.3 TO 5.5 | 5.5 TO 5.75 | 6.2 TO 6.5 | 6.5 TO 6.65 | 7.1 TO 7.5 | 7.5 TO 7.55 | 8.0 TO 8.45 | 8.9 TO 9.0 |
| DARK AREA COVERAGE | 0.0 TO 0.5 | 0.8 TO 1.0 | 1.0 TO 1.5 | 1.7 TO 2.0 | 2.0 TO 2.5 | 2.6 TO 3.0 | 3.0 TO 3.5 | 3.5 TO 3.95 | 4.0 TO 4.5 | 4.5 TO 4.85 | 5.0 TO 5.5 | 5.5 TO 5.75 | 6.0 TO 6.5 | 6.5 TO 6.65 | 7.0 TO 7.5 | 7.5 TO 7.55 | 8.0 TO 8.5 | 8.9 TO 9.0 |
| PERCENT DARK AREA | 100 | 40 | 100 | 60 | 100 | 80 | 100 | 90 | 100 | 70 | 100 | 50 | 100 | 30 | 100 | 10 | 100 | 20 |
| PIXEL STATUS | 0 | 1 | 0 | 0 | 0 | 0 | 0 | 0 | 0 | 0 | 0 | 0 | 0 | 1 | 0 | 1 | 0 | 1 |

*FIG. 5I*

| RELATIVE MOVEMENT OF SECONDARY SCALE 150 (CONFIGURATION) | BIT PATTERN (REPRESENTING THE OVERLAPPING PATTERN) AS FORMED IN THE IMAGE CAPTURING SYSTEM 120 |
|---|---|
| 0.0 | 0101000000000000101 — 610 |
| 0.1 | 0101010000000001 — 611 |
| 0.2 | 0101010100000000 — 612 |
| 0.3 | 0001010101000000 — 613 |
| 0.4 | 0000010101010000 — 614 |
| 0.5 | 0000000101010100 — 615 |
| 0.6 | 0000000010101010100 — 616 |
| 0.7 | 0000000000010101 — 617 |
| 0.8 | 0101000000000101 — 618 |
| 0.9 | 0101000000000101 — 619 |

ENHANCING THE RESOLUTION OF MEASUREMENT SYSTEMS EMPLOYING IMAGE CAPTURING SYSTEMS TO MEASURE LENGTHS

BACKGROUND OF THE INVENTION

1. Field of the Invention

The present invention relates to measuring systems, and more specifically to a method and apparatus for enhancing the resolution of measurement systems employing image capturing systems to measure lengths.

2. Related Art

Measurement systems often employ image capturing systems to measure various lengths. For example, an image capturing system may provide digital representations of images of an object, and an image processing system (also contained in the measurement system) may process the digital representations to determine the length of the object.

It is often desirable that measurement systems be implemented with a high resolution. As is well known, resolution generally refers to the shortest length (or change therein) a measurement system may detect accurately. For example, a measurement system with a resolution of 1 millimeter (mm) may measure the change of position of an object from 12 mm to 13 mm. Any change in the position of the object less than 1 mm may not be accurately detected by such a measurement system.

Resolution of measurement systems is often limited by the resolution of image capturing systems. For example, a prior image capturing system may be implemented using CCD (charge coupled device) containing several pixels, typically arranged in the form of a matrix. The resolution of such a CCD based system depends on the extent of area of an object captured by each pixel.

The resolution of measurement systems may be enhanced by using higher resolution CCDs (i.e., having more pixels covering a unit area of the image) and/or other optical components (e.g., telescopic lens and magnification lens). However, such components are generally expensive and thus the related implementations are often undesirable.

Accordingly what is needed is a method and apparatus for enhancing the resolution of measurement systems employing image capturing systems to measure lengths while meeting one or more of objectives similar to those described above.

SUMMARY OF THE INVENTION

An aspect of the present invention enables lengths to be measured at a greater resolution than a resolution offered by an image capturing system operating alone. In an embodiment, a first image of a first scale overlapping with a second scale is captured by an image capturing system, with the two scales having different pitches. A second image is captured after moving the first scale relative to the second scale by a distance. A digital processing system examines the first image and the second image to determine a length of the distance.

In an embodiment, the moving is performed in a linear direction such that the length is determined according to Vernier Principles. As may be appreciated, due to the use of different pitches for the two scales, the length may be measured at a greater resolution according to Vernier principles. In one implementation the difference of pitches of the two scales is achieved by using bands of unequal length. However, the bands in each scale are designed to be equal. Each scale may contain dark and white bands in alternative positions.

An aspect of the present invention stores data representing a plurality of configuration bit patterns in a digital processing system. Each configuration bit pattern represents a bit pattern generated by image capturing system in a corresponding configuration, wherein each configuration in turn represents a different offset of the first scale with respect to the second scale.

The digital processing system may receive a first bit pattern and a second bit pattern based on the first image and the second image. The two bit patterns are compared with the configuration bit patterns to determine a first configuration and a second configuration respectively. The offsets associated with the first configuration and the second configuration are used to determine the length (of movement).

The ability to determine length of movement may be used to measure the length of an object at the higher resolution. To enable such measurement, the object may be attached to the first scale such that the object moves along with the first scale. Assuming that a first edge of the object is present in a first pixel of the image capturing system, the first scale is moved until the first edge is detected in an adjacent pixel. A corresponding first length is determined.

The first scale is again moved until the second edge of the object is detected in a corresponding another adjacent pixel. A second length corresponding to the move is again determined. The first length and the second length are used to determine the length of the object with a high resolution.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein:

FIGS. 5A through 5I are tables illustrating the bit patterns generated by an image capturing in the nine configurations of FIGS. 4A through 4I;

DETAILED DESCRIPTION OF THE PREFERRED EMBODIMENTS

1. Overview and Discussion of the Invention

An aspect of the present invention enables a measurement system to be implemented with a higher resolution than a resolution offered by an image capturing system (used within the measurement system) operating alone. A relative movement of two scales with different pitches, is attained by moving one of the scales. Images representing the overlap of the two scales are captured before and after the move in a digital format using an image capturing system.

The resulting bit patterns are examined to determine the length of the move. Due to the use of scales with different pitches, the length of the move can be measured at a higher resolution than a resolution of the image capturing system.

In an embodiment, the relative movement is linear such that the measurement is based on Vernier Principles, well known in the relevant arts. The ability to measure the length of the move can be used to measure the length of an object of interest. For example, the object may be firmly attached to one of the two scales, the position of the edges of the object may be detected with enhanced resolution, and the length of the object may be determined based on the positions of the two edges.

The invention is described with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
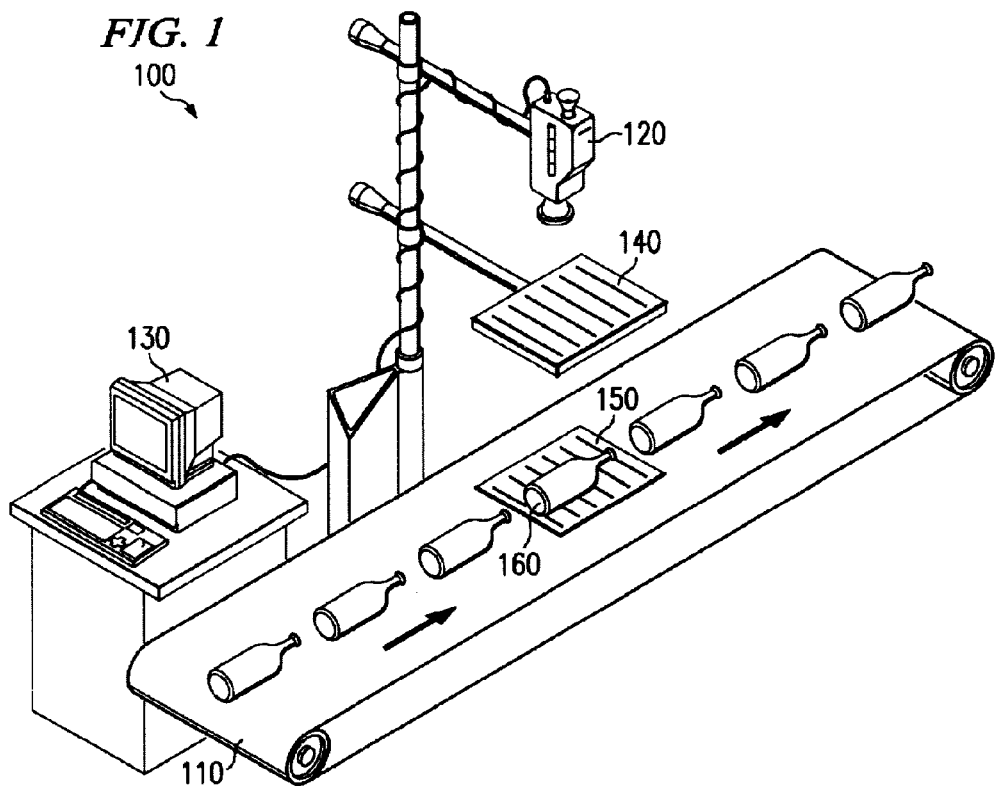
FIG. 1 is a block diagram of a measurement system illustrating the an example embodiment in accordance with the present invention.

FIG. 1 is a block diagram of measurement system 100 illustrating an example environment in which the present invention is implemented. Measurement system 100 is shown containing conveyor system 110, image capturing system 120, image processing system 130, primary scale 140, secondary scale 150, and object 160. As described below, the length of object 160 can be measured with a higher resolution than the resolution offered by image capturing system 120 operating alone. The components of FIG. 1 are described below in further detail.

Conveyor system 110 may be used to attain the relative linear movement of the two scales 140 and 150. However, depending on the type (and resolution desired) different systems may be used to achieve the relative movement. Conveyor system 110 is shown holding secondary scale 150 and object 160 such that both move along with the movement of conveyor system 110. The movement of conveyor system 110 causes each of the objects (bottles in FIG. 1) to be placed in a position suitable for measurement of length. The extent and direction of movement may be controlled from a digital processing system implementing image processing system 130 as well. Conveyor system 110 may be implemented in a known way.

Image capturing system 120 contains several pixels, with each pixel capturing a portion of an overlapping image formed from the two scales 140 and 150. Image capturing system 120 may capture the image of object 160 as well. Digital data representing the captured images is provided to image processing system 130. Image capturing system 120 may be implemented using technologies such as CCDs, and may be implemented in a known way. However, any technology which enables a digital representation of the overlapping images to be generated, can be used.

Primary scale 140 and secondary scale 150 are implemented with different pitches. In an embodiment, the different pitches are achieved by using bands of different width in the two scales. The resolution depends on the distance of the scales from image capturing system 120 and the width of bands. The resolution may be controlled by setting the width of the bands. In an embodiment, the width of the bands and the distance is controlled such that the width equaling each band of primary scale 140 is covered/captured by a pixel of image capturing system 120.

It may be appreciated that a high resolution for measurement system 100 is attained by using different pitches for the two scales. For example, assuming that primary scale 140 has a pitch of 1 unit and secondary scale 150 has a pitch of 0.9 unit, measurement system 100 may have a resolution of 0.1 unit (consistent with Vernier Principle) as described below in further detail.

The two scales may be implemented on transparent sheets engraved with bands. Example bands are illustrated in sections below. Primary scale 140 is shown as being stationary and with secondary scale 150 moving along with conveyor system 110. However, secondary scale 150 can be held to be stationary while moving primary scale 140.

Image processing system 130 receives data representing an overlapping pattern of the bands on two scales 140 and 150, and processes the received data to determine the length of movement of one scale relative to the other. In addition, image processing system 130 may control the relative movement until the edges of object 160 are detected. The lengths and position of edges may be used to determine the length of object 160. The manner in which the length of object 160 may be measured is described in further detail below with reference to FIG. 2.

3. Method

Figure 2:
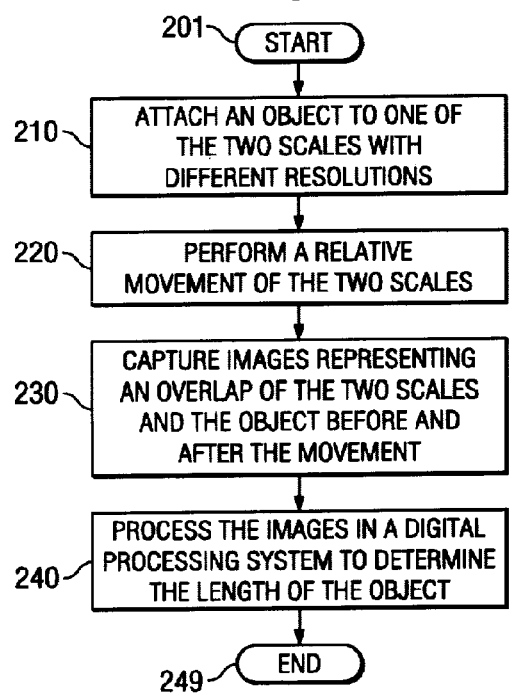
FIG. 2 is a flowchart illustrating a method by which the resolution of a measurement system can be enhanced according to an aspect of the present invention.

FIG. 2 is a flowchart illustrating the manner in which a length can be measured in an embodiment of the present invention. The method is described with reference to components of FIG. 1 for illustration. However, the method may be implemented in other embodiments as well. The method begins at step 201, in which the control passes to step 210.

In step 210, an object to be measured is attached to one of the two scales with different pitches. For example, object 160 is attached to secondary scale 150, as shown in FIG. 1. In step 220, a relative movement of the two scales is achieved. In the embodiment(s) of FIG. 1, the conveyor system 110 is moved in the linear direction such that object 160 and also the attached secondary scale 150 move relative to the stationary primary scale 140.

In step 230, images representing an overlap of the two scales and the object, before and after the movement are captured. In the embodiment of FIG. 1, image capturing system 120 may capture the image of object 160 in the upper half of image frames, and the overlapping patterns in the lower half. The captured images may be communicated to image processing system 130.

In step 240, the image data is processed to determine the length of the object. In an embodiment described below, an approximate length of object 160 is measured using primary scale 140. Object 160 is then moved until the two edges are located. The length of movement for locating each edge is determined with a high resolution, and the lengths of movements are used to compute the length of object 160.

The basis for attaining high resolution (in determining the length of movement) will be clearer by understanding Vernier Principle. Accordingly, the principle is described first briefly.

4. Vernier Principle

According to Vernier principle well known in the relevant arts, when two scales having respective pitches of N and (N×Q) (wherein Q is a number less 1) are used, measurements may be performed with a high resolution of N(1–Q). Such a high resolution is obtained because the overlapping patterns (of the two scales) move by a factor of N(1–Q) with the relative movement of the scales. The movement with the high factor is described below with reference to FIGS. 3 and 4A–4K.

Figure 3:
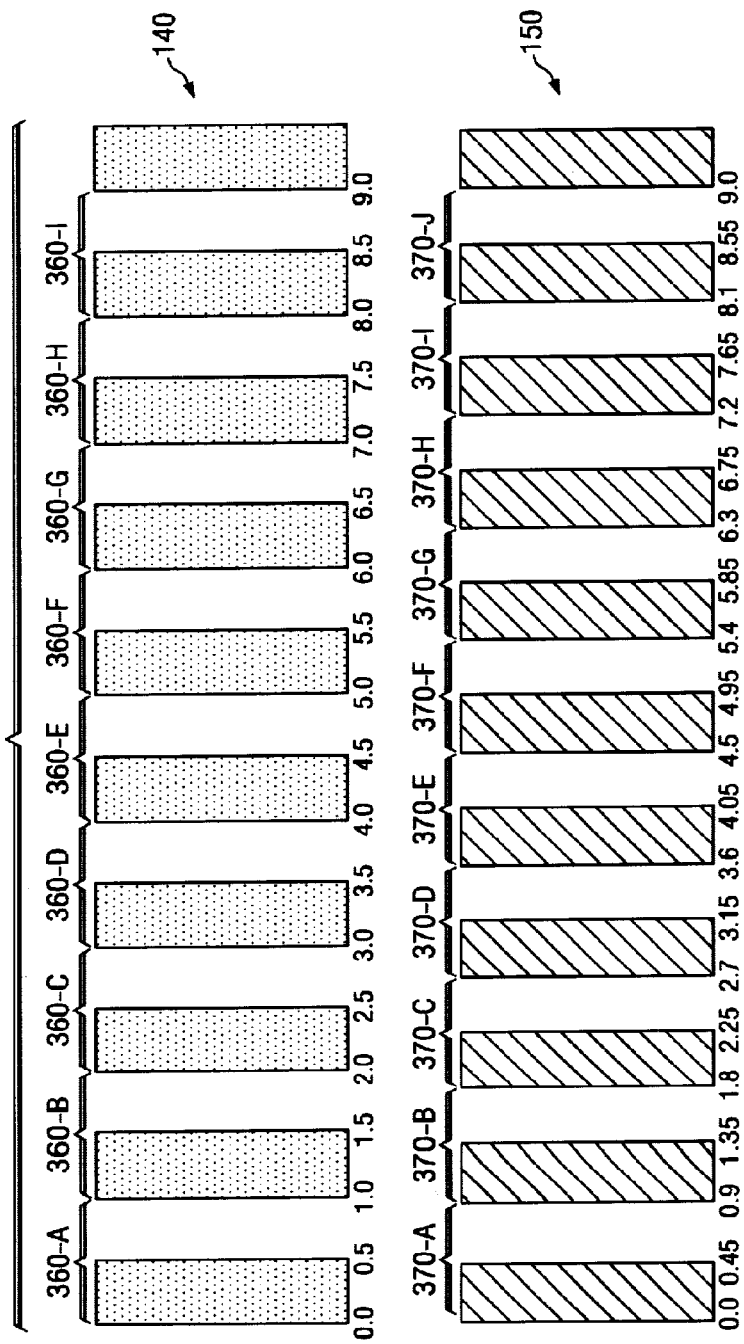
FIG. 3 is a diagram illustrating the two scales with different pitches used for increasing the resolution of an image capturing system in measuring length.

FIG. 3 is a diagram containing two scales, with secondary scale 150 having a pitch of 9/10 of the primary scale 140. Thus, 9 equal divisions (360-A through 360-I) on primary scale 140 together equal 10 equal divisions (370-A through 370-J) of secondary scale 150. For convenience, each division is shown containing an opaque band (shown as grey and black consistently for primary scale 140 and secondary scale 150 respectively) and a transparent band of equal lengths. Also, the length of each division on primary scale 140 is referred to as a unit.

FIGS. 4A through 4K respectively depict the overlapping patterns generated by the overlap of primary scale 140 and secondary scale 150 in nine possible configurations, with each configuration representing a different level of relative movement (in this case, by an increment of 0.1 unit) of the two scales. As described below, each of the 9 configurations may cause a different pattern to be generated by image capturing system 120. Accordingly, the captured pattern can be examined to determine the specific configuration of the two scales in each captured image.

Figure 4A:
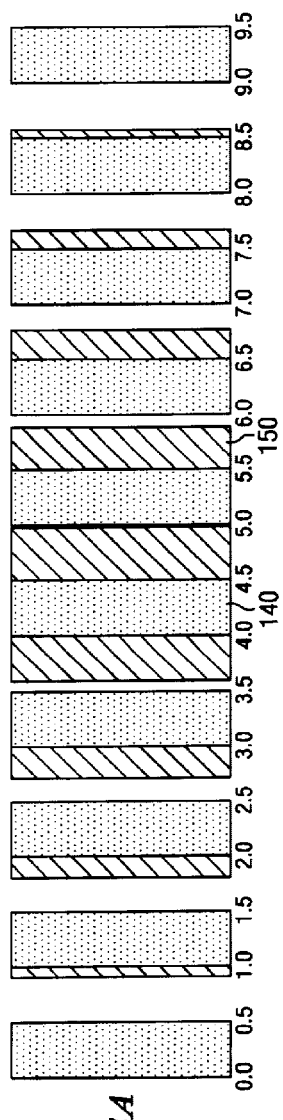
FIGS. 4A through 4I are diagrams illustrating the different overlapping patterns formed in different configurations, with each configuration representing a different level of relative movement of the two scales in an embodiment of the present invention.
Figure 4B:
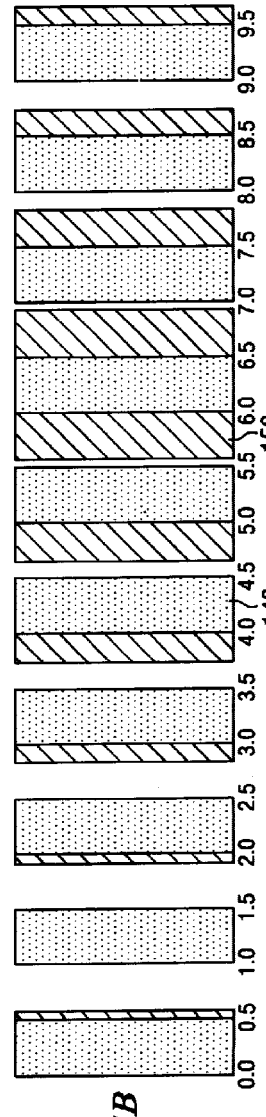
Figure 4C:
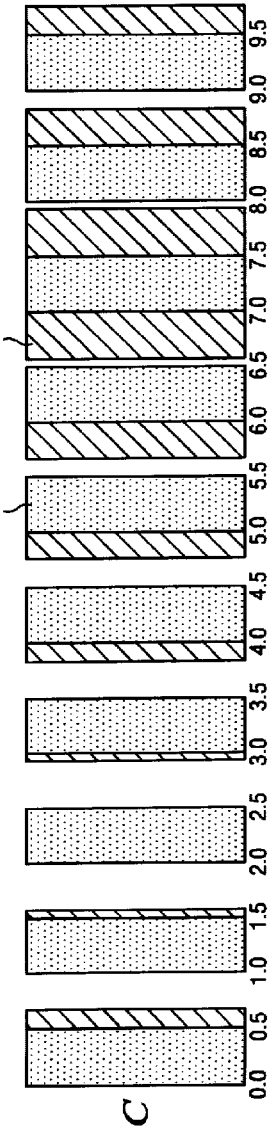
Figure 4D:
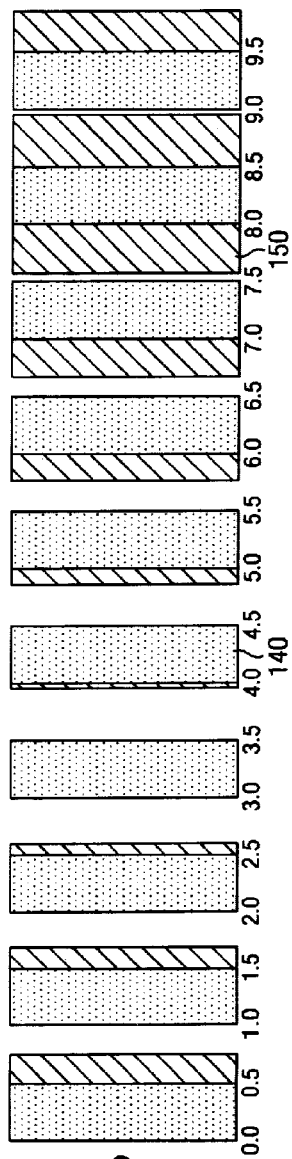
Figure 4E:
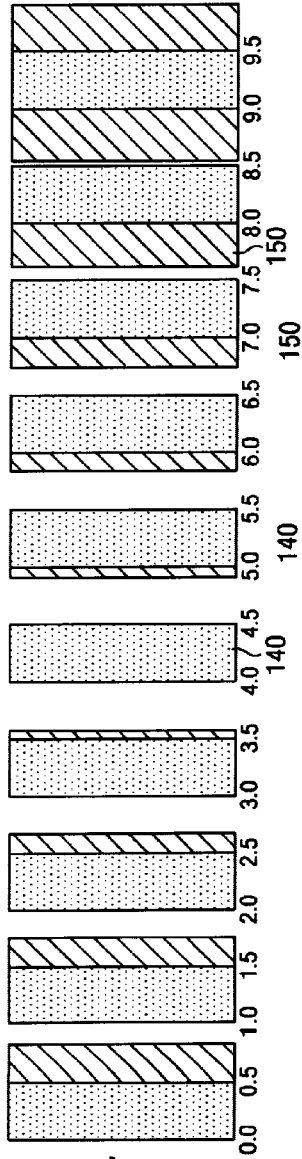
Figure 4F:
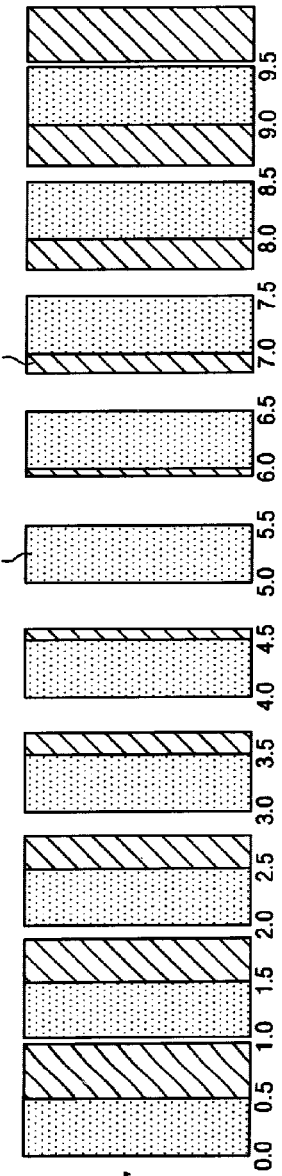
Figures 4G, 4H, 4I:
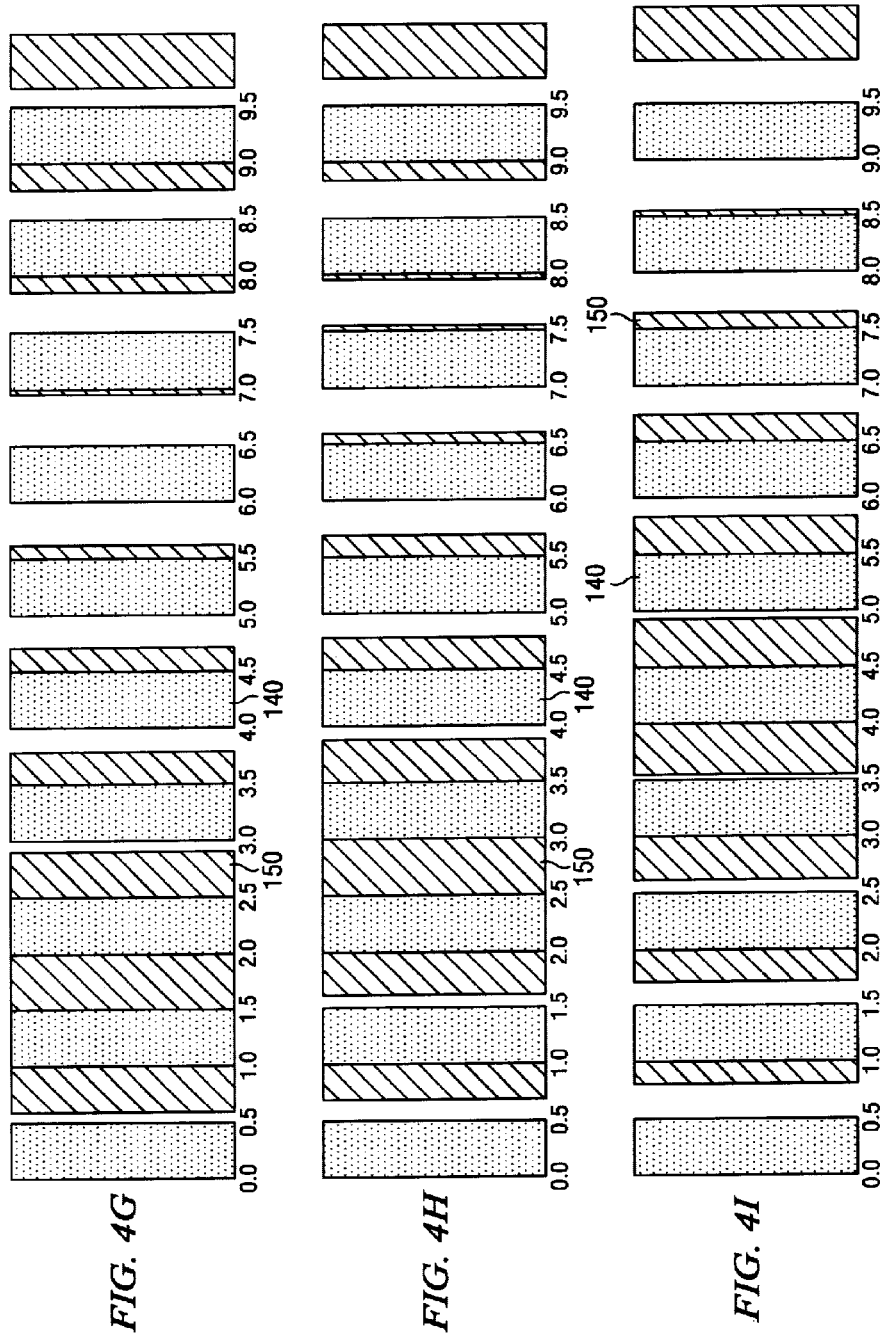

FIG. 4A depicts an overlapping pattern of the two scales (as viewed from image capturing system 120) when the zero division of secondary scale 150 coincides with the zero division of primary scale 140. The offset may be said to be zero in such a situation. When the dark portions of the two scales overlap, the corresponding portion is shown with grey color (representing opaque portion of primary scale 140) since primary scale 140 is between image capturing system 120 and secondary scale 150.

FIGS. 4B through 4I respectively represent the overlapping patterns when the offset (of secondary scale 150 with respect to primary scale 140) equals 0.1 through 0.8, in increments of 0.1. The patterns of FIGS. 4A through 4I repeat with additional relative movement in increments of 0.1.

As noted above, each configuration of FIGS. 4A through 4I causes image capturing system 120 to generate a corresponding bit pattern. The value of each bit in the bit pattern generally depends on various characteristics of image capturing system 120. In general, the value generated by a pixel depends on the area of light incident, intensity of light and the time of incidence. For simplicity, it is assumed in the below description that a pixel generates a value of zero if less than 50% of area in the pixel has incident light. The manner in which each bit pattern is formed under such an assumption is described below with examples.

5. Bit Patterns Formed in Each Configurations

FIG. 5A is a table illustrating the specific bit pattern generated by image capturing system 120 for the configuration of FIG. 4A in which a relative movement of 0.0 is present between secondary scale 150 and primary scale 140. It is helpful to appreciate that nine divisions on the primary scale 140 covers 18 pixels of the image capturing system 120 since each unit is described as being covered by two pixels. Thus, the table of FIG. 5A is shown containing 18 columns (560-A through 560-R) of data for the 18 pixels respectively. The data in the columns is described below with reference to rows of the table.

Row 561 indicates the coverage of each of the 18 pixels (as measured with reference to primary scale 140). As each pixel is designed to cover half a main scale unit, each entry is shown covering an interval of half a unit (0–0.5, etc.).

Row 562 indicates the dark portion caused by primary scale 140 in each of the 18 pixels. For example, in pixel 1, primary scale 140 is depicted as causing dark portion from 0.0 to 0.5 (as measured on primary scale 140) corresponding to the opaque band of 360-A. Similarly, the entry corresponding to pixel 9 is shown containing 4.0–4.5 consistent with the grey color starting at the number 4 in FIG. 4A. The other entries of row 562 are similarly described.

Row 563 represents the dark portion caused by secondary scale 150 in each of the 18 pixels. For example, in pixel 1, secondary scale 150 is depicted as causing dark portion from 0.0 to 0.45 corresponding to the opaque band of 370-A. Similarly, the entry corresponding to pixel 11 is shown containing 4.5 to 4.95 consistent with the dark color starting at 4.5 in FIG. 4A.

Row 565 indicates the total dark portion caused together by primary scale 140 and secondary scale 150. As may be appreciated, each entry of row 565 would equal the logical union (in set theory) of the corresponding entries in rows 562 and 563. Pixels with odd number would be entirely dark due to the opaque portion of primary scale 140.

Row 580 indicates the total percentage of dark portion in each of the pixels. Row 590 indicates the bit value (pixel status) generated by each pixel assuming that a value of 1 is generated if less than 50% of the pixel is covered by dark band, and a 0 otherwise. That is, if ¼ of unit is covered by white band, the corresponding pixel generates a value of 1.

By examining row 590, it may be observed that the configuration corresponding to FIG. 4A results in a bit pattern of 0101 0000 0000 0001 01 (space included merely for readability). The bit patterns for remaining eight configurations can e similarly determined, and the patterns are summarized in FIG. 6. Thus, the table of FIG. 6 is shown containing 9 bit patterns corresponding to the nine configurations (with different offsets in increments of 0.1).

Figures 6, 7:
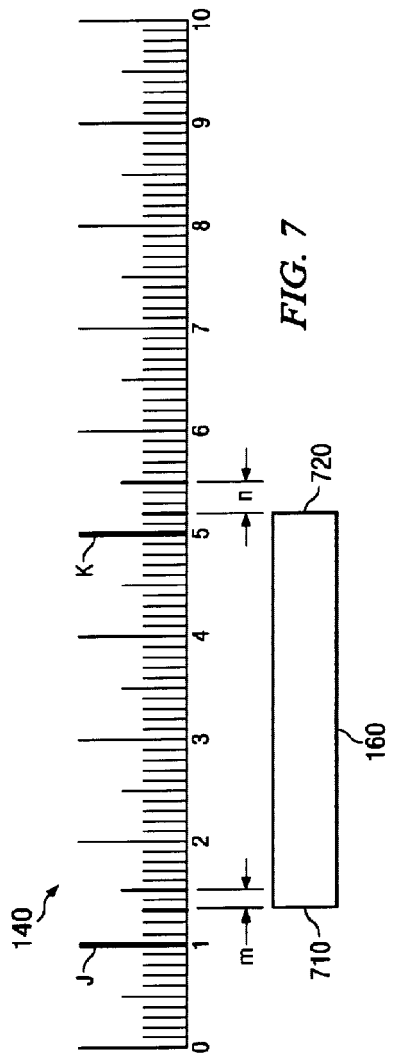
FIG. 6 is a table summarizing the bit patterns generated for the nine configurations of FIGS. 4A through 4I.
FIG. 7 is diagram illustrating the manner in which the length of an object can be determined with a high resolution in an embodiment of the present invention.

It may thus be appreciated that an ideal image capturing system 120 generates one of the nine bit patterns of FIG. 6 depending on the offset of secondary scale 150 in relation to primary scale 140. The bit patterns thus generated can be used to determine the length of movement of secondary scale 150 as described below.

6. Determining the Length of Movement

In an embodiment, a first image representing a pattern ("overlapping pattern") generated by the overlap of primary scale 140 and secondary scale 150 (in a first position) is generated. Image capturing system 120 generates a first bit pattern representing the captured first image. Secondary scale 150 is moved and a second bit pattern representing the overlapping pattern in the new position is generated.

Assuming that the first bit pattern corresponds to a configuration in which offset (relative to configuration of FIG. 4A) equals X, and the second bit pattern corresponds to an offset of Y, the movement from the first position to the new position can be easily determined based on X and Y. For example, if X=0.3 and Y=0.7, the movement equals 0.4 units. On the other hand, if X=0.8 and Y=0.1, the movement equals 0.3.

From the above, it may be appreciated that the specific configuration is determined based on a generated bit pattern. The manner in which the configuration may be determined is described below with additional examples.

7. Determining a Configuration Corresponding to the Bit Pattern

In an embodiment, a generated bit pattern is compared with each of the possible patterns noted in FIG. 6. The configuration (and thus offset) is determined based on the matching entry. For example, assuming that image capturing system 120 generates a pattern of 0000 0101 0101 0000 00, it may be determined that the corresponding image represents an overlapping pattern corresponding to the configuration of FIG. 4E having an offset of 0.4.

However, the bits of the bit pattern may not be generated accurately for a variety of reasons (e.g., parallax error, noise). Accordingly, several extensions may be considered as deemed appropriate for the specific environment to which various aspects of the present invention are applied. Some example extensions are described below in further detail.

In one example extension, each bit of the pattern is determined based on several pixels in a column of the CCD. That is, the value of the bit may be set equal to the majority value in a corresponding column. Such an approach eliminates errors introduced only at some of the points in the overlapping image as the majority of pixels in a column may correctly generate the corresponding bit value.

Thus, the bit pattern may be generated from a matrix of bit values (as opposed to just a single row), and the bit pattern may be compared with each of the possible bit patterns to determine the specific configuration the pattern represents. As the physical movement of secondary scale 150 takes substantial time (compared to speed of operation of electronic computations), the comparisons may not impede the overall throughput performance of measurement system 100.

However, when higher resolutions (e.g., 1000) are sought, faster approaches may be desirable. In an embodiment, the length and position of the longest dark band is specified associated with each bit pattern of FIG. 6. Thus, each of the bit patterns in rows 610–619 has a longest dark band covering 11 (adjacent) pixels, and the band starts at positions 5, 7, 9, 11, 13, 15, 17, 1, and 3.

Accordingly, when a bit pattern is received from image capturing system 120, image processing system 130 may quickly determine the length of the longest band and the starting position. The determined parameters may be compared with the corresponding parameters to quickly identify the specific row (configuration) of FIG. 6.

It may be appreciated that errors could alter a bit value, especially in situations when the white area is only marginally more than 50% of the pixel area. In an embodiment, more than 2 pixels (e.g., 4) may be used to cover each unit, and the value in the two pixels may be used to determine the bit value. Such a system would generally be more tolerant to marginal errors (and also help with edge detection, as described in sections below). However, the effective resolution of measurement system 100 would correspondingly decrease in such a situation.

Thus, using the approach(es) of above, the length of movement of secondary scale 150 (and thus object 160) may be determined with an accuracy of 1/10 of unit (in the illustrative example). The length of movement can in turn be used to measure the length of object 160 as described below.

8. Measuring Length of Object

FIG. 7 is a diagram illustrating the manner in which the length of object 160 is measured in an embodiment of the present invention. Object 160 is shown as having two edges 710 and 720, which are respectively located past units J and K respectively. Due to the low resolution (1 unit) of image capturing system 120 operating alone, the length of object 160 may be determined to be (K−J) units in the example of FIG. 7. The manner in which the length can be measured with a higher resolution is described below.

For illustration, object 160, along with secondary scale 150, is assumed to be moved from left to right gradually, while trying to detect the specific points at which edge 710 moves from one pixel to the next pixel of image capturing system 120 (or CCD, in one embodiment). It is assumed that edge 710 is moved by a distance 'm' (as measured by examining the overlapping patterns) for the edge to move from one pixel to the next. Similarly, 'n' represents a distance edge 720 is moved for the edge to move to a next pixel.

The positions $P_{710}$ and $P_{720}$ of edges 710 and 720 are respectively given by the following equations:

$$P_{710} = J + (5-m)/10 \qquad \text{Equation (1)}$$

$$P_{720} = K + (5-n)/10 \qquad \text{Equation (2)}$$

The length of object 160 is given by the equation:

$$\text{Length} = P_{720} - P_{710} = (K-J) + (n-m)/10 \qquad \text{Equation (3)}$$

By examining Equation (3), it may be appreciated that the length of object 160 can be determined at a higher resolution using Vernier principles. It may be further appreciated that edges 710 and 720 may need to be accurately detected for accurately determining m and n in the above Equations. The manner in which the edges may be detected is described below with reference to examples.

9. Edge Detection

Edge detection may be performed using one of several known approaches. In an embodiment, a series of images of overlapping patterns along with object 160 at corresponding position is captured within very short intervals while moving conveyor system 110 gradually. The series of images may be examined sequentially until an edge moves out of a present pixel or appears first in a next pixel.

In general, edge detection is simplified if high color contrast is present between an edge and the surroundings. For example, assuming that the entire object is black and the entire background is white, an edge may be detected when a pixel value changes from black to white or vice versa. However, real-world applications may not match such a scenario, and implementations generally need to take into account the deviations. Some example deviations and the corresponding example solutions are noted below.

A pixel may generate values in between black (0) and white (255, assuming each pixel generates a 8 bit value). In such a situation, a threshold (e.g., 128) may be set, the values above which are all converted to 255 and the values below to 0. This generally provides greater contrast for further analysis of the resulting image data.

While the base ability to measure length of movement of a scale with a high resolution is described as being used a basis for determining the length of an object with a correspondingly high resolution, it should be understood that the base ability can be used to provide several other features as well. For example, the position of various edges of an object can be determined accurately in both vertical and horizontal directions, and a precise map of the object can be generated within image processing system. In an embodiment, image processing is performed substantially in the form of software in a general purpose computer system as described below in further detail.

10. Image Processing System

Figure 8:
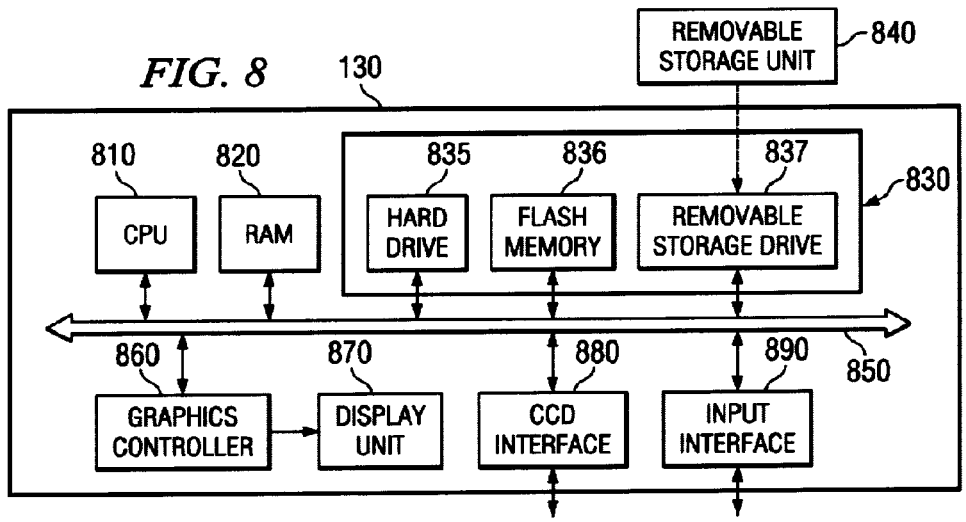
FIG. 8 is a block diagram of a digital processing system illustrating the implementation of image processing system substantially in the form of software in an embodiment of the present invention.

FIG. 8 is a block diagram illustrating an example embodiment of image processing system 130. Image processing system 130 may contain one or more processors such as central processing unit (CPU) 810, random access memory (RAM) 820, secondary memory 830, graphics controller 860, display unit 870, CCD interface 880, and input interface 890. All the components, except display unit 870, may communicate with each other over communication path 850, which may contain several buses as is well known in the relevant arts. The components of FIG. 8 are described below in further detail.

Graphics controller 860 generates display signals (e.g., in RGB format) to display unit 870 based on data/instructions received from CPU 810. Display unit 870 contains a display screen to display the images defined by the display signals. Input interface 890 may correspond to a key-board and/or mouse, and generally enables a user to provide inputs. Display unit 870 and input interface 890 may together enable a user to interface with image processing system 130. CCD interface 880 enables digital data representing images to be received from image capturing system 120.

Secondary memory 830 may contain hard drive 835, flash memory 836 and removable storage drive 837. Flash memory 836 (and/or hard drive 835) may store the software instructions (including both system software and user applications) and data (e.g., configuration bit patterns), which enable Image processing system 130 to provide several features in accordance with the present invention.

Some or all of the data and instructions may be provided on removable storage unit 840, and the data and instructions may be read and provided by removable storage drive 837 to CPU 810. Floppy drive, magnetic tape drive, CD-ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer usable storage medium having stored therein computer software and/or data. An embodiment of the present invention is implemented using software running (that is, executing) in image processing system 130.

In this document, the term "computer program product" is used to generally refer to removable storage unit 840 or hard disk installed in hard drive 835. While secondary memory 830 is shown contained within image processing system 130, it should be understood the memory may be provided from external systems and transferred, for example, on a IP network. These computer program products are means for providing software to image processing system 130.

CPU 810 may execute instructions stored in RAM 820 to provide several features of the present invention. CPU 810 may contain multiple processing units, with each processing unit potentially being designed for a specific task. RAM 820 may receive instructions from secondary memory 830 using communication path 850. Data may be stored and retrieved from secondary memory 830 during the execution of the instructions. Execution of the instructions can provide various features of the present invention. Some of the features provided by such execution are described below with reference to FIG. 9.

11. Method in Image Processing System

Figure 9:
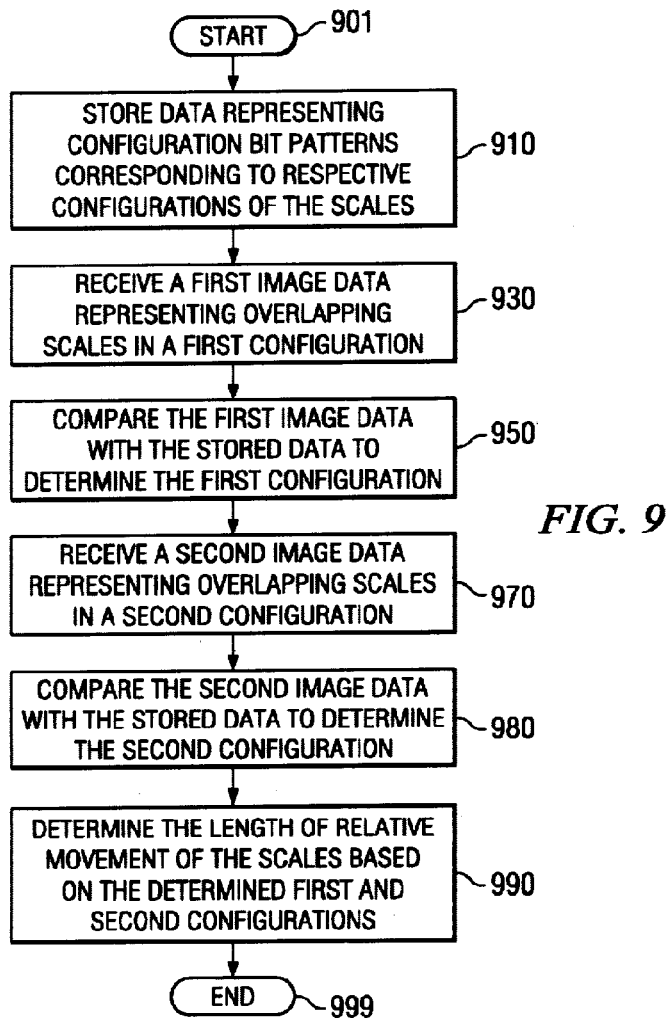
FIG. 9 is a flowchart illustrating the manner in which a length can be measured with a high resolution in an embodiment of the present invention.

FIG. 9 is a flowchart illustrating the manner in which a length can be measured in an embodiment of the present invention. The method is described with reference to components of FIG. 8 for illustration. However, the method may be implemented in other embodiments as well. The method begins at step 901, in which the control passes to step 910.

In step 910, data representing configuration bit patterns corresponding to respective configurations of the scales may be stored in RAM 820 (may be stored in one of the components of secondary memory 830 and retrieved when required). For example, the bit patterns and the corresponding configurations shown in FIG. 6 may be stored.

In step 930, a first image data representing overlapping scales in a first configuration may be received from image capturing system 120 via CCD interface 880. In general, the data is in the form of a matrix (rows and columns) representing the overlapping images of the two scales 140 and 150 in one portion and object 160 in the other portion.

In step 950, the first image data may be compared with the bit patterns stored in step 910. The configuration with the configuration bit pattern matching (at least closely) the first image data, may be determined. The normalization technique(s) noted above may be used to generate a single row from the matrix of data. The single row may be compared with the stored configuration bit patterns to determine the configuration in which the two scales 140 and 150 are in.

Steps 970 (to receive image data for the second configuration) and 980 (to determine the second configuration) may be performed similar to steps 930 and 950. In step 990, CPU 810 may compute a length of relative movement of the two scale 140 and 150 as described in the sections above. The method ends in step 999.

Thus, the approaches described above can be used to measure various lengths with a greater degree of resolution than that offered by an image capturing system operating alone.

12. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of measuring lengths at a greater resolution than a resolution offered by an image capturing system, said method comprising:

capturing in said image capturing system, a first image of a first scale overlapping with a second scale, wherein said first scale has a first pitch and said second scale has a second pitch, wherein said first pitch is not equal to said second pitch, said first pitch determined by a width of each of said first plurality of bands and said second pitch determined by a width of each of said second plurality of bands, further comprising storing data representing a plurality of configuration bit patterns, wherein each of said plurality of configuration bit patterns represents a corresponding one of a plurality of configurations, wherein each of said plurality of configurations represents a different offset of said first scale with respect to said second scale and said first scale contains a first plurality of bands and said second scale contains a second plurality of bands, each of said first plurality of bands being of a first width and each of said second plurality of bands being of a second width, wherein said first width is not equal to said second width;

moving said first scale relative to said second scale by a distance;

capturing in said image capturing system, a second image of said first scale overlapping with said second scale after said moving; and examining, using a digital processing system, said first image and said second image to determine a length of said distance, wherein said examining comprises receiving in said digital processing system a first bit pattern and a second bit pattern based on said first image and said second image, comparing said first bit pattern and said second bit pattern with said plurality of configuration bit patterns to determine a first configuration and a second configuration respectively, wherein offsets associated with said first configuration and said second configuration are used to determine said length.

2. The method of claim 1, wherein a second edge of said object is present in a second pixel of said image capturing system, further comprising:

moving said first scale further until said second edge is detected in another adjacent pixel, wherein said another adjacent pixel is next to said second pixel;

capturing in said image capturing system, a third image of said first scale overlapping with said second scale when said second edge is detected in said another pixel; and determining a second length according to said first image and said third image, wherein said length of said object is determined based on said second length and said length of said distance.

3. The method of claim 2, further comprising smoothing edges of said first image, said second image and said third image.

4. A method of measuring lengths at a greater resolution than a resolution offered by an image capturing system, said method being performed in a digital processing system, said digital processing system being coupled to said image capturing system, said image capturing system being designed to capture overlapping images of a first scale and a second scale having different pitches, said method comprising:

storing a plurality of configuration bit patterns associated with a corresponding plurality of offsets, said plurality of configuration bit patterns representing respective bit patterns which would be generated by said image capturing system when said first scale and said second scale are in a overlapping position with a corresponding one of said plurality of offsets;

receiving a first bit pattern and a second bit pattern, wherein said first bit pattern represents a first image of said first scale and said second scale before a move of said first scale relative to said second scale, said second bit pattern representing a second image of said first scale and said second scale after said move;

receiving a first matrix of data bits representing said first image;

setting each bit of said first bit pattern to a majority bit value in a corresponding column in said matrix of data bits;

comparing said first bit pattern and said second bit pattern with said plurality of configuration bit patterns to determine a first matching configuration bit pattern and a second matching configuration bit pattern respectively, wherein said first matching bit pattern and said second matching bit pattern are comprised in said plurality of configuration bit patterns;

computing a length of said move according to offsets associated with said first configuration bit pattern and said second configuration bit pattern; and determining a length of an object attached to said first scale by receiving a third bit pattern representing an image after said object is moved further, and examining said third image as well to determine said length.

5. A computer readable medium encoded with one or more computer programs for causing a digital processing system to measure lengths at a greater resolution than a resolution offered by an image capturing system, said digital processing system being coupled to said image capturing system, said image capturing system being designed to capture overlapping images of a first scale and a second scale having different pitches, wherein execution of said one or more sequences of instructions by one or more processors contained in said digital processing system causes said one or more processors to perform the actions of:

storing a plurality of configuration bit patterns associated with a corresponding plurality of offsets, said plurality of configuration bit patterns representing respective bit patterns which would be generated by said image capturing system when said first scale and said second scale are in a overlapping position with a corresponding one of said plurality of offsets;

receiving a first bit pattern and a second bit pattern, wherein said first bit pattern represents a first image of said first scale and said second scale before a move of said first scale relative to said second scale, said second bit pattern representing a second image of said first scale and said second scale after said move;

receiving a first matrix of data bits representing said first image;

setting each bit of said first bit pattern to a majority bit value in a corresponding column in said matrix of data bits;

comparing said first bit pattern and said second bit pattern with said plurality of configuration bit patterns to determine a first matching configuration bit pattern and a second matching configuration bit pattern respectively, wherein said first matching bit pattern and said second matching bit pattern are comprised in said plurality of configuration bit patterns; and computing a length of said move according to offsets associated with said first configuration bit pattern and said second configuration bit pattern; and determining a length of an object attached to said first scale by receiving a third bit pattern representing an image after said object is moved further, and examining said third image as well to determine said length.

* * * * *